(12) United States Patent
Rodgers et al.

(10) Patent No.: US 8,135,046 B2
(45) Date of Patent: Mar. 13, 2012

(54) METHOD AND APPARATUS FOR DEMULTIPLEXING, MERGING, AND DUPLICATING PACKETIZED ELEMENTARY STREAM/PROGRAM STREAM/ELEMENTARY STREAM DATA

(75) Inventors: Stephane W. Rodgers, San Diego, CA (US); Daniel Z. Simon, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 993 days.

(21) Appl. No.: 11/273,102

(22) Filed: Nov. 11, 2005

(65) Prior Publication Data
US 2007/0110065 A1 May 17, 2007

(51) Int. Cl.
*H04J 3/00* (2006.01)

(52) U.S. Cl. ......................... 370/535; 370/542

(58) Field of Classification Search .................. 370/389, 370/392, 466, 535, 542–544; 725/131–132, 725/151–152
See application file for complete search history.

(56) References Cited

U.S. PATENT DOCUMENTS

| | | | |
|---|---|---|---|
| 7,415,014 B2 * | 8/2008 | Chen et al. | 370/535 |
| 2002/0001309 A1 * | 1/2002 | Saito | 370/389 |
| 2002/0067744 A1 * | 6/2002 | Fujii et al. | 370/535 |
| 2003/0021346 A1 * | 1/2003 | Bixby et al. | 725/86 |
| 2006/0080110 A1 * | 4/2006 | Foster et al. | 370/351 |
| 2006/0262651 A1 * | 11/2006 | Cooper et al. | 368/68 |
| 2010/0118980 A1 * | 5/2010 | Zhu | 375/240.26 |

* cited by examiner

*Primary Examiner* — Pao Sinkantarakorn
(74) *Attorney, Agent, or Firm* — Thomas, Kayden, Horstemeyer & Risley, LLP

(57) ABSTRACT

Presented herein are system(s) for demultiplexing, merging, and duplicating packetized elementary stream/program stream/elementary stream data. In one embodiment, there is presented a system for processing data. The system comprises a first circuit and a memory. The first circuit receives transport packets carrying the data. The memory stores data and comprises at least one context. The first circuit maps the data associated with at least one channel to the at least one context.

27 Claims, 6 Drawing Sheets

METHOD AND APPARATUS FOR DEMULTIPLEXING, MERGING, AND DUPLICATING PACKETIZED ELEMENTARY STREAM/PROGRAM STREAM/ELEMENTARY STREAM DATA

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A transport stream can comprise multiplexed data from a variety of channels, and a variety of transponders. The data can then be provided to decoders for decoding and eventual presentation. The increasing number of channels and potential destinations place considerable demultiplexing demands on media systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for demultiplexing, merging, and duplicating packetized elementary stream/program stream/elementary stream data substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
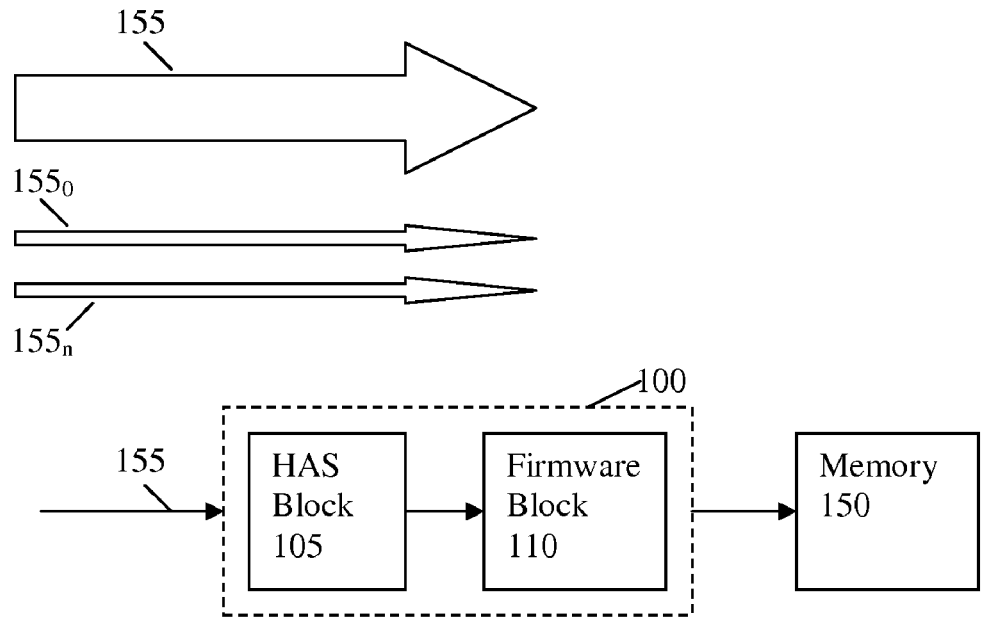
FIG. 1a illustrates a block diagram of an exemplary Record Audio/Video Engine, in accordance with an embodiment of the present invention.

Referring now to FIG. 1A, there is illustrated a block diagram of an exemplary architecture of a Record Audio/Video Engine (RAVE) 100, in accordance with an embodiment of the present invention. The exemplary RAVE 100 may comprise a hardware assist block 105, and a firmware block 110. The RAVE 100 demultiplexes the input 155 and stores the demultiplexed input 155 to memory 150. The input 155 comprises audio, video, and other data, carried in packets that are known as transport packets. In certain embodiments of the present invention, the firmware 110 may comprise a processor executing a plurality of instructions.

The data pipe can include multiple bands $155_0$, $155_1$, ... $155_n$, each of which are usually from a different source. The individual bands can include a number of individual channels 160. The RAVE 100 can examine a unique identifier in the transport packet headers that identifies a single data stream associated with a channel. The RAVE can also use a unique identifier inside ancillary data which travels with each packet to accomplish the same task.

The memory 150 stores a plurality of contexts. The RAVE 100 separates data going to different destinations into "contexts" where a context is defined as a set of buffers to be used by a single downstream client. The RAVE 100 separates out the individual streams or substreams and sends the streams or substreams to the memory 150. A context may store any subset of the input data pipe.

Although the memory 150 is illustrated as a single module, it should be understood that the memory 150 can be multiple modules with various levels of organization. Accordingly, memory 150 shall not be limited to single modules.

The RAVE 100 may map the entire input data pipe to a single context. Alternatively, the RAVE 100 may map individual bands to separate contexts (including all channels within the band). Also, the RAVE 100 may map individual channels within a single band or different bands to separate contexts. The RAVE 100 may map subsets from single or different bands to separate contexts. Single channels and bands may be mapped to single or multiple contexts.

In certain embodiments of the present invention, once a data stream or partial data stream has been mapped to a context, that context is completely independent of any others in the system, and errors or catastrophic events should have no effect on other contexts. This is true even if other contexts are fed with the same data, or a portion of the same data. This is because each context is sent to a separate final destination (e.g., video or audio decoders, or host processors) and errors causing problems in one of the destinations should not cause errors in other destinations.

In certain embodiments of the present invention, the RAVE 100 may perform a wide variety of tasks and may operate with the different input formats. The RAVE 100 may also perform another of other functions, such as providing ancillary information about the incoming data to assist the downstream audio or video decoders; providing timestamp management support; providing methods for synchronizing commands from software with the data stream; providing flexibility to support new, as-yet unanticipated formats, and being able to do all of the aforementioned functions at high speeds such as, for example, 100+ Mbits/sec. In this regard, a fast yet programmable solution may be desirable. Such a solution may utilize a double buffer and/or a hardware assist and may be implemented in a record audio video engine (RAVE).

In certain embodiments of the present invention, the system 100 may process incoming transport packets, where the hardware assist block 105 may partially process a portion of a first transport packet, resulting in a partially processed first transport packet. The firmware block 110 may execute a set of instructions to process the remainder of the partially processed first packet. The hardware assist block 105 may partially process a second transport packet while the firmware block 110 is processing the remainder of the first transport packet. When the firmware block 110 completes processing the first transport packet, the firmware block 110 may begin processing the remainder of the partially processed second transport packet, and at the same time, the hardware assist block 105 may partially process a third transport packet. The processing may continue where the hardware assist block 105 partially processes a transport packet, while the firmware block 110 processes the remainder of the partially processed previous transport packet.

In an embodiment of the present invention, a RAVE may support multiple decoders that support audio and/or video decoding. The RAVE may also support software for recording and accessing record data for video playback. Therefore, the RAVE may be a block that combines record functionalities and the audio/video decoding functions. The RAVE may be capable of processing the transport associated with each of the video decoding, audio decoding, and the record functions. The RAVE may be designed such that it may provide flexibility to allow for subsequent algorithmic changes as may be needed by data format changes, for example. Additionally, the RAVE may maintain a high throughput.

Figure 1B:
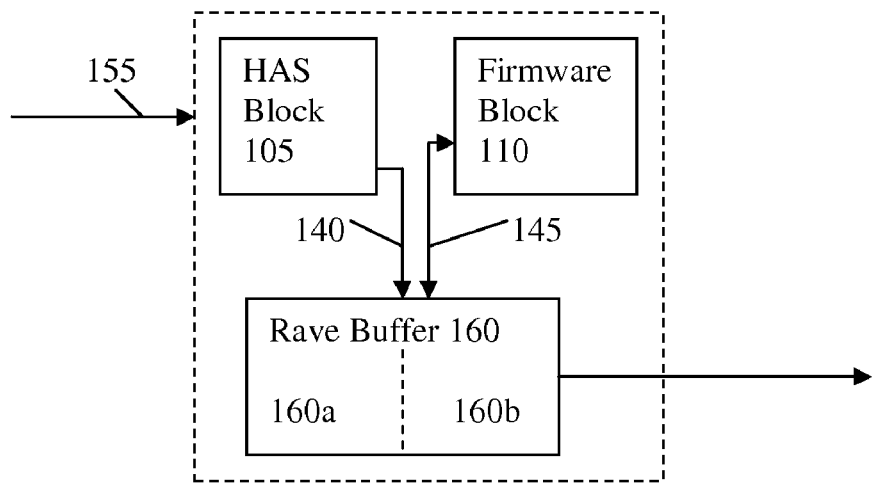
FIG. 1b is a block diagram of another exemplary Record Audio/Video Engine, in accordance with an embodiment of the present invention.

FIG. 1B illustrates a block diagram of exemplary architecture of a system or RAVE 100, in accordance with an embodiment of the present invention. The RAVE 100 may comprise a hardware assist block 105, a firmware block 110, and a RAVE buffer 160.

The hardware assist block 105 may then perform some processes and pass processed data to firmware block 110 via the RAVE buffer 160. A portion of the processed data may be passed from the hardware assist block 105 via data path 140 to the RAVE buffer 160, which may then be accessed by the firmware block 110 via data path 145.

Several schemes may be utilized for interfacing the hardware assist block 105 with the firmware block 110. To increase flexibility and allow for subsequent algorithmic changes, and to maintain high throughput, one or more schemes may be utilized within a RAVE. Using the combination of hardware assist and firmware, the RAVE may provide the flexibility associated with programmability of firmware, and the speed associated with hardware. The hardware assist 105 and the firmware 110 may be interfaced such that speed and programmability may be maintained simultaneously.

In one embodiment of the present invention, one approach may be to have incoming transport packets examined by both the hardware assist 105 and the firmware 110. The hardware assist 105 may provide signals comprising information regarding each byte of the incoming transport packets as they are received. The information may indicate, for example, the type of byte or the location of the byte, such as, for example, the start of the code, etc. The firmware 110 may then read the signals provided by the hardware assist 105 and based on the received signals make a decision as to whether the received byte is to be processed using functions available in the firmware 110 or other algorithms.

For example, as a transport packet comes in, the hardware assist 105 may examine the data, and may look for a data pattern. When the hardware assist 105 sees the pattern it may send a trigger signal to the firmware 110. The trigger signal may be, for example, an interrupt. The firmware 110 may then use the interrupt to begin a process associated with the identified pattern.

In one embodiment of the present invention, another approach may be for the hardware assist 105 to perform major functions, and allow for certain functions to be performed by the firmware 110. The hardware assist 105 may process a portion of the incoming transport packets and the firmware 110 may process the remaining portion of the incoming transport packets.

In one embodiment of the present invention, the hardware assist 105 may perform major functions, or portions thereof. The functions associated with incoming transport packets may be broken down into sub-functions. The hardware assist 105 may perform major functions and/or sub-functions. The firmware 110 may perform a remaining portion of the functions and/or sub-functions.

In one embodiment of the present invention, the hardware assist 105 may operate on an incoming transport packet, and may output data regarding the processed transport data to a particular portion of the RAVE buffer 160a. During the next packet time, i.e., when the next incoming transport packet is being processed by the hardware assist 105, the firmware 110 may retrieve and process the previous transport packet and associated data from the portion of the RAVE buffer 160a.

In another embodiment of the present invention, the hardware assist 105 may process functions that may be less likely to change such as, for example, MPEG parsing, and the firmware 110 may make most or all of the final decisions of the RAVE 100. Functions that may change as a result of, for example, a new data format may be processed mainly by the firmware 110 with some processing that may be done by the hardware assist 105.

The hardware assist 105 may perform a portion of the functions associated with the processing of the transport packet A, and may retrieve information associated with the transport packet A as well. The hardware assist 105 may then set up the hardware assist fields and may write retrieved information to a portion of the RAVE buffer 160a.

The hardware assist field may comprise, for example, address(es) of a compare pattern, compare patterns, start/end of PES headers, number of ES bytes in the packet, number of payload bytes in the packet, start of payload, presence of packet errors, type of packet (record or audio/video), etc.

After the hardware assist 105 performs the portion of the functions assisted with the first transport packet A, the firmware 110 may then access and begin processing the data associated with the first transport packet A from the portion of the RAVE buffer 160a, and write the processed data to the portion of the RAVE buffer 160a. Meanwhile, while the firmware 110 is processing the previously received first transport packet A, the hardware assist 105 may process transport packet B (a second transport packet) and write the associated retrieved data to another portion of the RAVE buffer 160 such as, for example, a portion 160b. The firmware 110 may then begin processing the transport packet B from the portion 160b of the RAVE buffer 160, and the hardware assist 105 may process the next transport packet C (a third transport packet) and write the associated information in portion of RAVE buffer 160a, overwriting the data associated with the transport packet A previously processed by the firmware 110.

Figure 2:
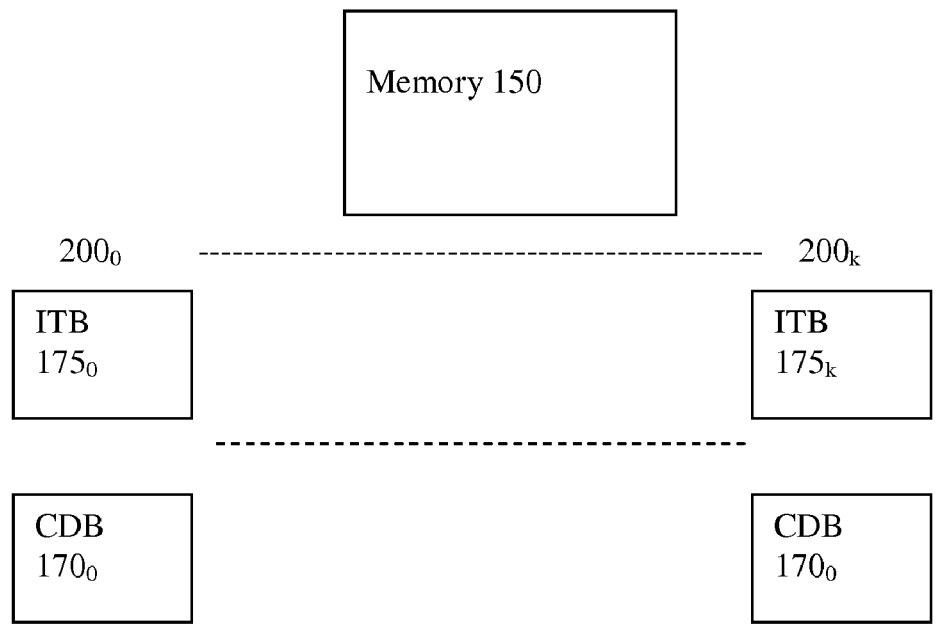
FIG. 2 is a block diagram of exemplary contexts in accordance with an embodiment of the present invention.

Referring now to FIG. 2, there is illustrated a block diagram of exemplary contexts $200_0 \ldots 200_k$. An exemplary context 200 includes one data buffer CDB which can store some of the incoming data which is mapped to the context, while some of the incoming data is stripped out as part of the multiple upper packet layers. The exemplary context 200 also includes another buffer ITB for storing ancillary information about the stream that is synchronous with the data. This information may contain timestamp information, pattern matching and frame synchronization information, as well as other information from the original stream that may be unavailable to the downstream client due to data stripping.

The memory 150 comprises a plurality of contexts $200_0 \ldots 200_k$. The contexts comprise a context data buffer CDB $170_0 \ldots 170_k$ and an ITB $175_0 \ldots 175_k$. The CDB $170_0 \ldots 170_k$ are data buffer that store some of the incoming data that is mapped to the context, while the ITB $175_0 \ldots 175_k$ stores ancillary information about the stream that is synchronous with the data. This information may contain timestamp information, pattern matching and frame synchronization information, as well as other information from the original stream that may be unavailable to the downstream client due to data stripping.

As noted above, the RAVE 100 may map the entire input data pipe to a single context. Alternatively, the RAVE 100 may map individual bands to separate contexts (including all channels within the band). Also, the RAVE 100 may map individual channels within a single band or different bands to separate contexts. The RAVE 100 may map subsets from single or different bands to separate contexts. Single channels and bands may be mapped to single or multiple contexts.

Figure 3:
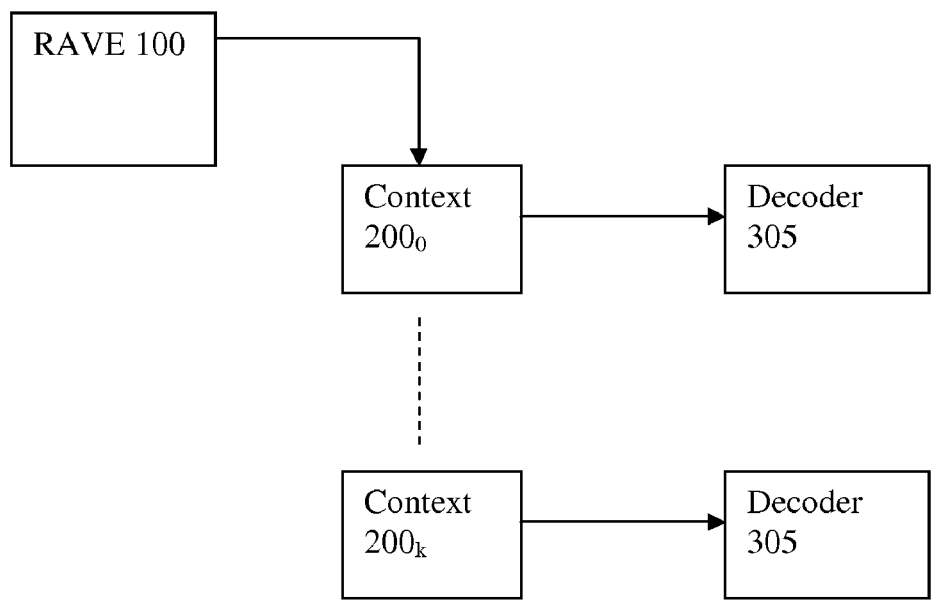
FIG. 3 is a block diagram of an exemplary multi-media system in accordance with an embodiment of the present invention.

Referring now to FIG. 3, there is illustrated a block diagram describing an exemplary multimedia system 300 in accordance with an embodiment of the present invention. The multimedia system 300 comprises a RAVE 100, a plurality of contexts 165, and a plurality of decoders 305. Each decoder 305 is associated with a particular context 165. The decoders 305 can comprise, for example, an audio decoder or video decoder. Additionally, a host processor can be associated with a particular one of the contexts 165.

The RAVE 100 separates out individual streams or substreams and sends the individual streams or substreams to the particular contexts 165. As noted above, the RAVE 100 may map the entire input data pipe to a single context. Alternatively, the RAVE 100 may map individual bands to separate contexts (including all channels within the band). Also, the RAVE 100 may map individual channels within a single band or different bands to separate contexts. The RAVE 100 may map subsets from single or different bands to separate contexts. Single channels and bands may be mapped to single or multiple contexts.

Figure 4:
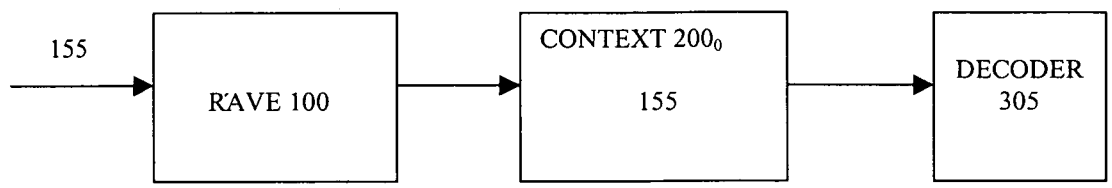
FIG. 4 is a block diagram describing the mapping of a data pipe to a single context in accordance with an embodiment of the present invention.

Referring now to FIG. 4, there is illustrated a block diagram describing the mapping of a data pipe 155 to a single context $200_0$ in accordance with an embodiment of the present invention.

The RAVE 100 receives the data pipe 155 and maps the data pipe 155 to a single context $200_0$. The decoder $305_0$ can then selectively decode at least portions of the data 155 stored in the single context $200_0$.

Figure 5:
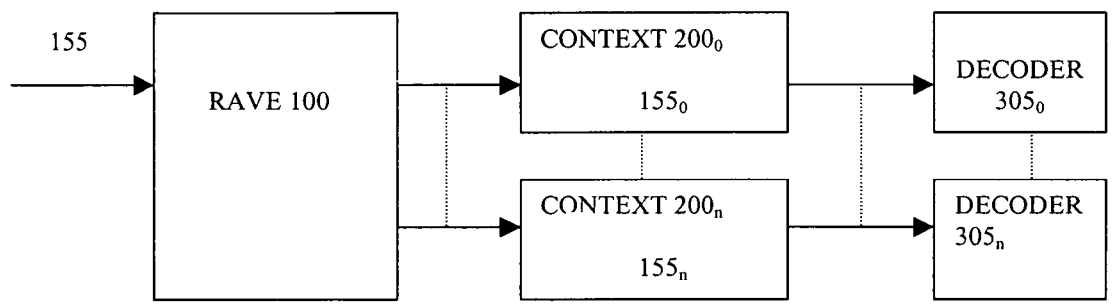
FIG. 5 is a block diagram of individual bands mapped to separate context in accordance with an embodiment of the present invention.

Referring now to FIG. 5, there is a illustrated block diagram of individual bands $155_0 \ldots 155_n$ mapped to separate contexts $200_0 \ldots 200_n$ in accordance with an embodiment of the present invention.

The RAVE 100 receives the data 155 and maps the different data bands $155_0 \ldots 155_n$ to separate contexts $200_0 \ldots 200_n$. The decoders $305_0 \ldots 305_n$ can then selectively decode at least portions of the data bands $155_0 \ldots 155_n$ stored in the context associated therewith.

Figure 6:
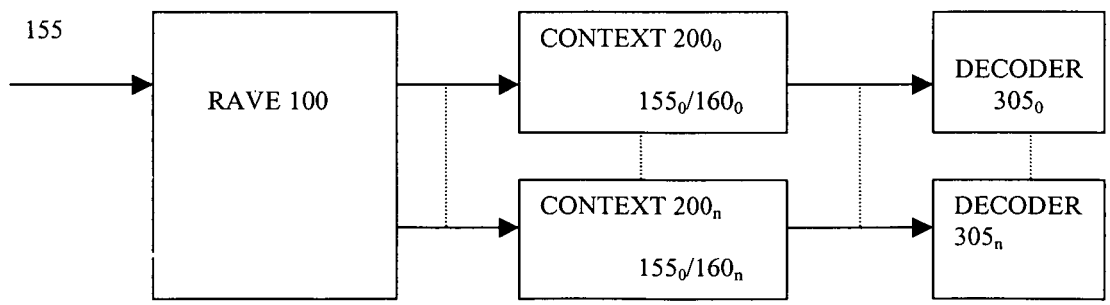
FIG. 6 is a block diagram of individual channels within a single band mapped to separate contexts in accordance with an embodiment of the present invention.

FIG. 6 is a block diagram of individual channels $160_0 \ldots 160_n$ within a single band $155_0$ mapped to separate contexts $200_0 \ldots 200_n$ in accordance with an embodiment of the present invention.

The RAVE 100 receives the data 155 and maps the different channels $160_0 \ldots 160_n$ of band $155_0$ to separate contexts $200_0 \ldots 200_n$. The decoders $305_0 \ldots 305_n$ can then selectively decode at least portions of the different channels $160_0 \ldots 160_n$ stored in the context associated therewith.

Figure 7:
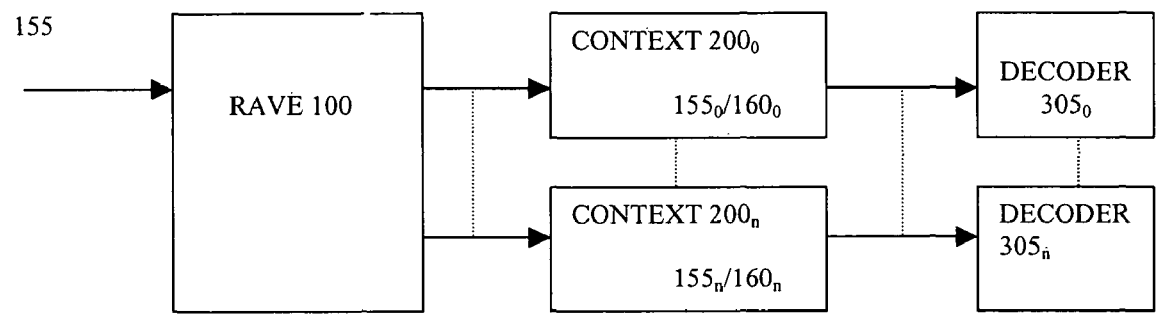
FIG. 7 is a block diagram of different bands mapped to separate contexts in accordance with an embodiment of the present invention.

FIG. 7 is a block diagram of individual channels $160_0 \ldots 160_n$ from different bands $155_0 \ldots 155_n$ mapped to separate contexts $200_0 \ldots 200_n$ in accordance with an embodiment of the present invention.

The RAVE 100 receives the data 155 and maps the different channels $160_0 \ldots 160_n$ of bands $155_0 \ldots 155_n$ to separate contexts $200_0 \ldots 200_n$. The decoders $305_0 \ldots 305_n$ can then selectively decode at least portions of the different channels $160_0 \ldots 160_n$ stored in the context associated therewith.

Figure 8:
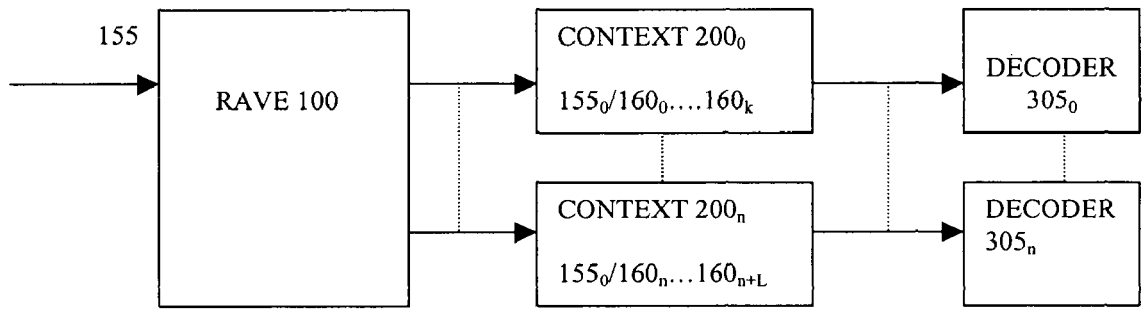
FIG. 8 is a block diagram of a subset of channels within a band mapped to one context in accordance with an embodiment of the present invention.

FIG. 8 is a block diagram of a subset of channels, e.g., $160_0 \ldots 160_k, 160_n \ldots 160_{n+L}$ within a band $155_0$ mapped to one context in accordance with an embodiment of the present invention.

The RAVE 100 receives the data 155 and maps the different subsets of channels e.g., $160_0 \ldots 160_k, 160_n \ldots 160_{n+L}$ within band $155_0$ to separate contexts $200_0 \ldots 200_n$. The decoders $305_0 \ldots 305_n$ can then selectively decode at least portions of the channel(s) stored in the context associated therewith.

Figure 9:
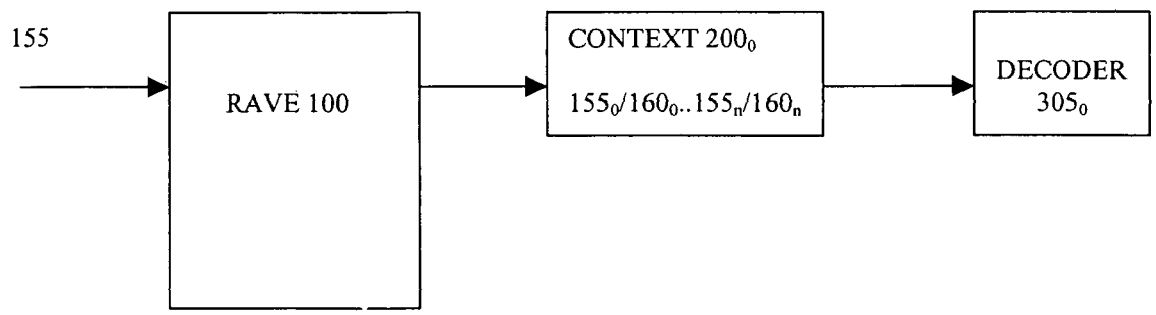
FIG. 9 is a block diagram of individual channels from different bands mapped to the same context.

FIG. 9 is a block diagram of individual channels from different bands, e.g., $155_0/160_0 \ldots 155_n/160_n$ mapped to the same context $200_0$ in accordance with an embodiment of the present invention.

The RAVE 100 receives the data 155 and maps the channels from different bands, e.g., $155_0/160_0 \ldots 155_n/160_n$ to separate contexts $200_0 \ldots 200_n$. The decoders $305_0 \ldots 305_n$ can then selectively decode at least portions of channels $155_0/160_0 \ldots 155_n/160_n$ stored in the context associated therewith.

Figure 10:
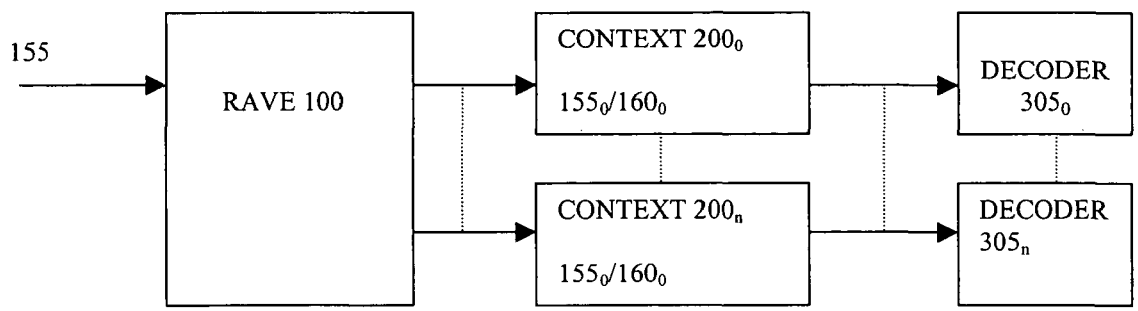
FIG. 10 is a block diagram of a single channel mapped to multiple contexts in accordance with an embodiment of the present invention.

FIG. 10 is a block diagram of a single channel $160_0$ mapped to multiple contexts $200_0 \ldots 200_n$ in accordance with an embodiment of the present invention.

The RAVE 100 receives the data 155 and maps the channel $160_0$ to contexts $200_0 \ldots 200_n$. The decoders $305_0 \ldots 305_n$ can then selectively decode at least portions of channel $160_0$ stored in the context associated therewith.

Figure 11:
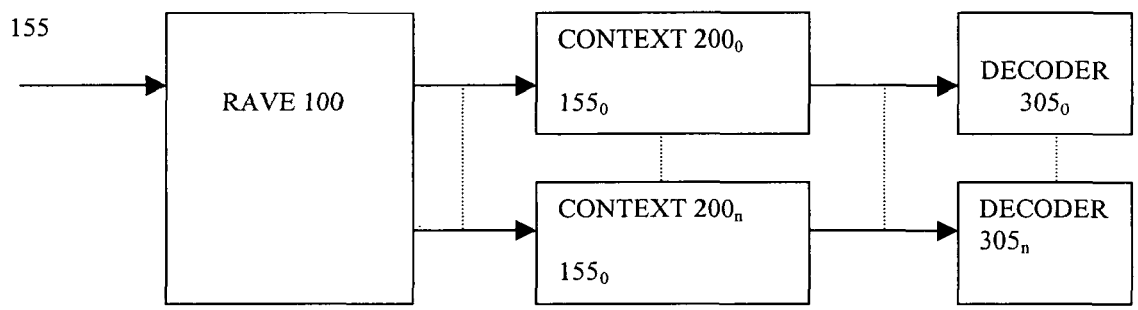
FIG. 11 is a block diagram of a single band mapped to multiple contexts in accordance with an embodiment of the present invention.

FIG. 11 is a block diagram of a single band $155_0$ mapped to multiple contexts $200_0 \ldots 200_n$ in accordance with an embodiment of the present invention.

The RAVE 100 receives the data 155 and maps the single band $155_0$ to the multiple contexts $200_0 \ldots 200_n$. The decoders $305_0 \ldots 305_n$ can then selectively decode at least portions of band $155_0$ stored in the context associated therewith.

Figure 12:
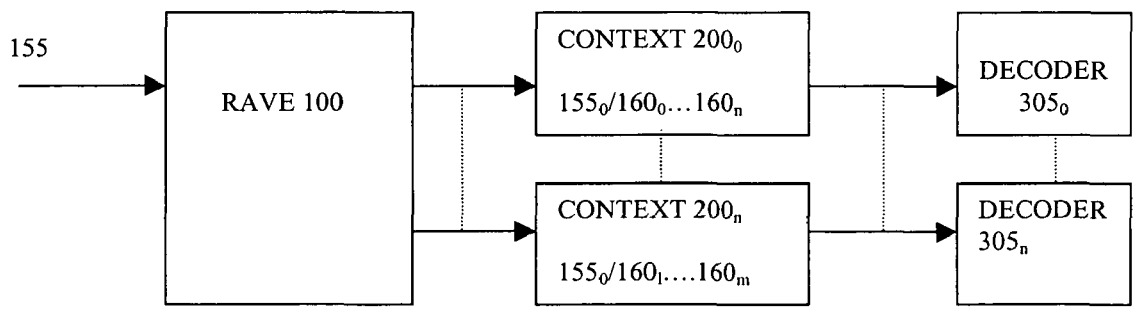
FIG. 12 is a block diagram of individual channels within a band mapped to one context, while a subset of the channels are mapped to another context in accordance with an embodiment of the present invention.

FIG. 12 is a block diagram of individual channels $160_0 \ldots 160_n$ within a band $155_0$ mapped to one context $200_0$, while a subset of the channels $160_1 \ldots 160_m$ are mapped to another context $200_n$ in accordance with an embodiment of the present invention.

The RAVE 100 receives the data 155 and maps individual channels $160_0 \ldots 160_n$ within a band $155_0$ to one context $200_0$, and a subset of the channels $160_1 \ldots 160_m$ to another context $200_n$. The decoders $305_0 \ldots 305_n$ can then selectively decode at least portions of channels stored in the context associated therewith.

Figure 13:
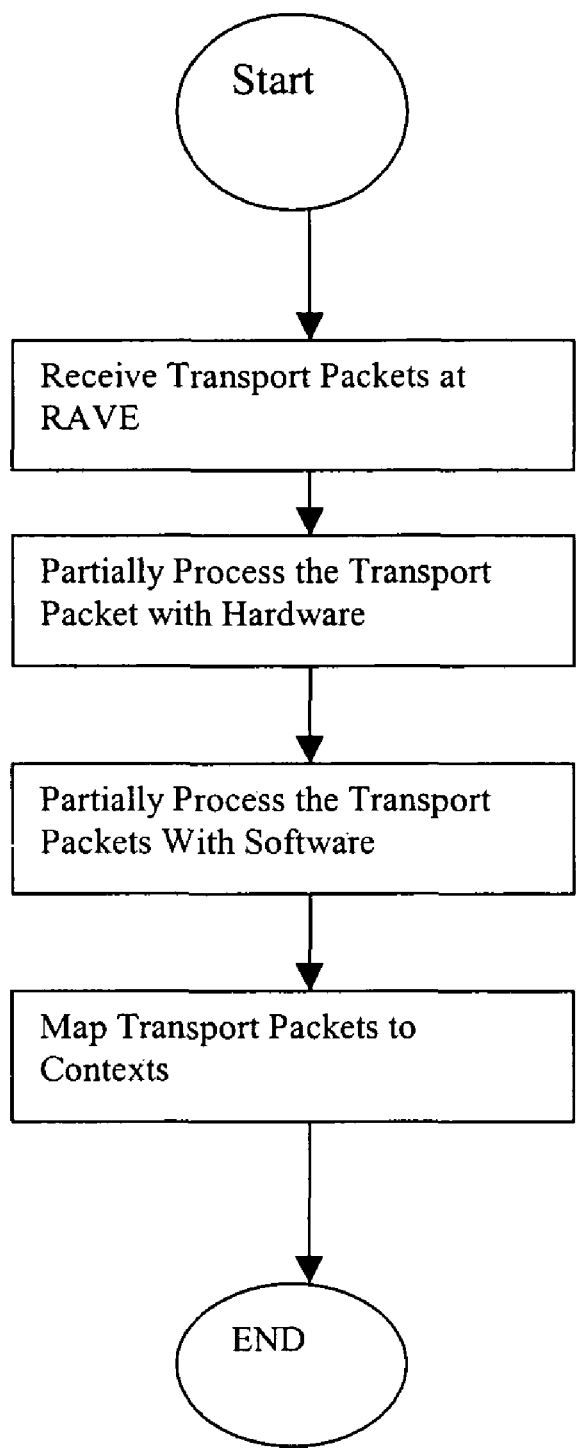
FIG. 13 is a flow diagram for processing data in accordance with an embodiment of the present invention.

Referring now to FIG. 13, there is illustrated a flow diagram for processing data in accordance with an embodiment of the present invention. At 1305, transport packets carrying the data are received at RAVE 100. At 1310 hardware partially processes the transport packets. At 1315, software partially processes the transport packets. At 1320, the transport packets are mapped to context in accordance with any of the mappings described in FIGS. 4-12.

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as firmware.

The degree of integration may primarily be determined by the speed and cost considerations. Because of the sophisticated nature of modern processors, it is possible to utilized a commercially available processor, which may be implemented external to an ASIC implementation.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A system for processing data, said system comprising:
a first circuit for receiving transport packets carrying multiplexed data associated with a plurality of channels;
memory for storing a plurality of contexts, each of said plurality of contexts associated with a corresponding one of a plurality of video decoders; and
wherein the first circuit demultiplexes and maps data associated with at least one channel of the plurality of channels to at least one of the plurality of contexts associated with at least one of the plurality of video decoders and maps data associated with at least another channel of the plurality of channels to at least another one of the plurality of contexts associated with at least another one of the video decoders; and
wherein the plurality of channels carry a corresponding plurality of different content
wherein the first circuit maps the data associated with the plurality of channels within a band to a particular one of the plurality of contexts, and maps the data associated with a portion of the plurality of channels within the band to another one of the plurality of contexts.

2. The system of claim 1, wherein the first circuit comprises:
hardware for partially processing the packets, wherein the hardware examines the packets for a start code; and
a processor for executing instructions, wherein execution of the instructions causes the processor to partially process the packets.

3. The system 1, wherein the first circuit maps data from a plurality of bands to a particular one of the plurality of contexts.

4. The system of claim 1, wherein the first circuit maps the data associated with each one of a plurality of bands to particular ones of the plurality of contexts.

5. The system of claim 4, wherein the first circuit maps and detects unique identifiers for each of the different channels on each of the different bands.

6. The system of claim 1, wherein the first circuit maps the data associated with each one of a plurality of channels from a particular band to particular ones of the plurality of contexts.

7. The system of claim 1, wherein the first circuit maps data associated with individual channels of different bands to particular ones of the plurality of contexts.

8. The system of claim 1, wherein the first circuit maps the data associated with a subset of a plurality of channels within the band to a particular one of the plurality of contexts.

9. The system of claim 1, wherein the first circuit maps the data associated with the individual channels from different bands to a particular one of the plurality of contexts.

10. The system of claim 1, wherein the first circuit maps the data associated with a single channel to the plurality of contexts.

11. The system of claim 1, wherein the first circuit maps the data associated with a particular band to the plurality of contexts.

12. The system of claim 1, wherein each of the plurality of contexts comprise a context data buffer for storing portions of the data received by the first circuit, and an incoming transport buffer (ITB) for storing control data associated with the portions of the data stored in the context data buffer.

13. The system of claim 1, wherein the system further comprises:
the plurality of video decoders for decoding data stored in the contexts, wherein each one of the plurality of video decoders is associated with particular ones of the plurality of contexts.

14. The system of claim 13, wherein the memory stores another plurality of contexts, each of said another plurality of contexts associated a plurality of audio decoders, said system further comprising:
the plurality of audio decoders for decoding audio data.

15. The system of claim 1, wherein the first circuit maps the at least one channel and the at least another channel by detecting the presence of at least one unique identifier in transport packets associated with the at least one channel, and at least another unique identifier in the transport packet associated with the at least another channel.

16. A method for processing data, said method comprising:
receiving transport packets carrying the data at a first circuit, wherein the transport packets multiplex data associated with at least one channel and data associated with at least another channel;
mapping the data associated with the at least one channel to one of a plurality of contexts by the first circuit; and mapping the data associated with the at least another channel to another one of the plurality of contexts;
wherein the one or more contexts are stored in a memory; and
wherein the first circuit maps the data to a particular one of the plurality of contexts, and wherein the data comprises data from a plurality of bands; and
wherein the plurality of channels carry a corresponding plurality of different content; and
wherein the first circuit maps the data associated with the plurality of channels within a band to a particular one of the plurality of contexts, and maps the data associated with a portion of the plurality of channels within the band to another one of the plurality of contexts.

17. The method of claim 16, further comprising:
partially processing the transport packets with hardware; and
partially processing the transport packet with a processor executing instructions, wherein execution of the instructions causes the processor to partially process the packets.

18. The method of claim 16, wherein the data comprises data associated with a plurality of bands, and wherein the first circuit maps the data associated with each one of the plurality of bands to particular ones of the plurality of contexts.

19. The method of claim 16, wherein the data comprises data associated with a plurality of channels from a particular band, and wherein the first circuit maps the data associated with each one of the plurality of channels to particular ones of the plurality of contexts.

20. The method of claim 16, wherein the mapping the at least one channel further comprises detecting the presence of at least one unique identifier in transport packets associated with the at least one channel, wherein mapping the at least another channel further comprises detecting the presence of at least another unique identifier in transport packet associated with the at least another channel.

21. A system for processing data, said system comprising:
a first circuit for receiving transport packets carrying the data;
memory for storing data, said memory storing a plurality of contexts; and
wherein the first circuit maps the data associated with at least one channel to the at least one context; and
wherein the data comprises data associated with a plurality of channels within a band, and wherein the first circuit maps the data associated with the plurality of channels within the band to a particular one of the plurality of contexts, and maps the data associated with a portion of the plurality of channels within the band to another one of the plurality of contexts; and
wherein each of the plurality of contexts comprise a context data buffer for storing portions of the data received by the circuit, and an incoming transport buffer for storing control data associated with the portions of the data stored in the context data buffer.

22. The system 21, wherein the first circuit maps data from a plurality of bands to a particular one of the plurality of contexts.

23. The system of claim 21, wherein the first circuit maps the data associated with each one of a plurality of bands to particular ones of the plurality of contexts.

24. The system of claim 21, wherein the first circuit maps the data associated with a subset of the plurality of channels within the band to a particular one of the plurality of contexts.

25. The system of claim 21, wherein the first circuit maps data associated with individual channels of different bands to particular ones of the plurality of contexts.

26. The system of claim 21, wherein the first circuit maps the data associated with a single channel to the plurality of contexts.

27. The system of claim 21, wherein the first circuit maps the data associated with a particular band to the plurality of contexts.

* * * * *